Jan. 14, 1958 H. BARTELS ET AL 2,819,961
PROCESS FOR CONNECTING A TANTALUM ELECTRODE
PIN TO AN ELECTRODE BODY
Filed Dec. 10, 1953
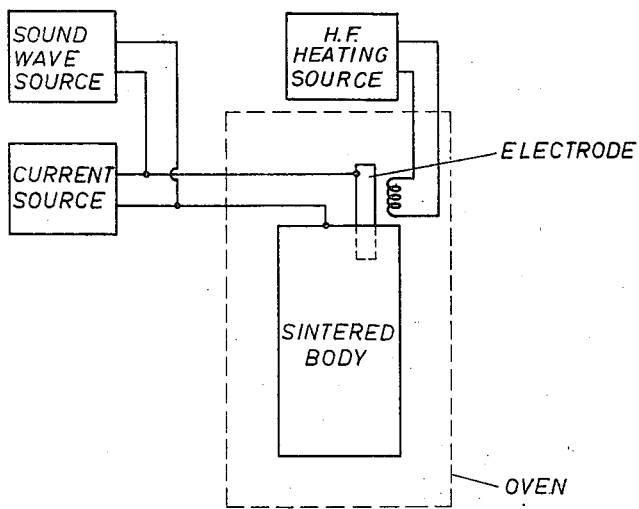
INVENTOR
HEINRICH BARTELS-
HELMUT FRITSCH
BY *Philip M. Bolton*
ATTORNEY

United States Patent Office 2,819,961
Patented Jan. 14, 1958

2,819,961

PROCESS FOR CONNECTING A TANTALUM ELECTRODE PIN TO AN ELECTRODE BODY

Heinrich Bartels and Helmut Fritsch, Nurnberg, Germany, assignors to International Standard Electric Corporation, New York, N. Y., a corporation of Delaware Application December 10, 1953, Serial No. 397,384

Claims priority, application Germany December 20, 1952

3 Claims. (Cl. 75—208)

This invention relates to the production of sintered electrodes for the use in electrolytic condensers and in particularly for electrodes made of tantalum.

It is known to produce electrodes to electrolytic condensers in such a way that a powder of the electrode metal is pressed into the shape of a porous body, and then sintering the porous body to establish electric contact between the individual powder particles. Such types of sintered bodies, owing to their high porosity and large surface, materially increase the capacity of the condenser. However, difficulties were found to exist when manufacturing such types of sintered electrodes, especially tantalum electrodes. For example, when providing a mechanical holding device and achieving an electric connection, a pin of tantalum is generally pressed into the sintered body of tantalum. However, it was found that such a connection, did not provide the necessary reliable electrical contact between the body of powdered metal and the pin of tantalum. The reason for this shortcoming is probably in the forming process heretofore employed. It is known that the sintered electrode has formed thereon, during the formation process, a dielectric layer of oxide, and it is believed that the metal bridges between the particles of the sintered body and the pin of tantalum, which exist in relatively small numbers and little strength, are chiefly or completely oxidized during this treatment. Consequently, the original existing electrical contact between the pin of tantalum and the sintered body is lost at least partly, and often even entirely.

In accordance with the invention, there is provided a process for connecting an electrode pin to a sintered electrode body, adapted for use in an electrolytic condenser, comprising pressing said pin a given distance into a powdered electrode body, sintering said body while simultaneously applying additional heat to said pin to produce an efficient weld therebetween.

The above-mentioned and other features and objects of this invention and the manner of attaining them will become more apparent and the invention itself will be best understood by reference to the accompanying figure schematically showing suitable apparatus including sources of H. F. heat, sound wave and current and an oven.

As is well-known, tantalum is a metal having a very high melting point. When annealing the pressed body consisting of tantalum powder, which is mostly carried out in a vacuum or in a protective gas atmosphere, the pressed-in pin of tantalum and the powder particles arranged around this pin, are obviously heated less than the jacket of the pressed body. Consequently, the powder particles on the jacket of the pressed body are welded satisfactorily to each other, but the contact with the pin of tantalum is inferior. This can be traced, partly, to the considerable carry-off of heat by the pin of tantalum. According to the invention, therefore, the pressed-in pin of tantalum is separately heated. This can be effected, e. g. by connecting an electric circuit directly to the pin of tantalum projecting out of the body of powdered metal. Inductive heating is likewise of some advantage because stronger currents are induced in the pin, owing to the greater amount of continuous mass of metal, than in the individual powder particles. Accordingly, the pin will be heated to a higher temperature and a good weld with the powder particles pressed around the pin is produced.

As is well-known, there is formed on the tantalum exposed to air, a thin coating of tantalum oxide. This coating represents an obstacle to a good weld of the individual particles, in particular with the pressed-in pin of tantalum. According to a further embodiment of this invention, the tantalum oxide is thermally decomposed. This decomposition, is performed approximately in the state of welding-heat and produces at the welding point a pure tantalum metal. In this way there is obtained a good weld of the different parts.

To further improve the weld between the pressed-in pin and pressed body, sound vibrations or ultrasonic waves may be impressed on the body during the heating thereof, particularly during the sintering process. These vibrations are preferably conducted to the body via the pin of tantalum.

While we have described above the principles of our invention in connection with specific process, it is to be clearly understood that this description is made only by way of example and not as a limitation of the scope of our invention as set forth in the objects thereof and in the accompanying claims.

What is claimed is:

1. A process for connecting a tantalum electrode pin to a sintered electrode body, adapted for use in an electrolytic condenser, comprising pressing said pin a given distance into a powdered tantalum body, applying heat for sintering said body, and simultaneously and separately heating said pin to approximately the welding temperature thereof, to produce an efficient weld between the pin and tantalum body.

2. The process according to claim 1, wherein the step of separately applying heat to said pin comprises heating said pin inductively.

3. The method according to claim 1, and further comprising applying sound vibrations to the powder body and pin during the heating process to effect a better weld.

References Cited in the file of this patent

UNITED STATES PATENTS

| 1,671,953 | Gilson | May 29, 1928 |
| 2,409,307 | Patch et al. | Oct. 15, 1946 |
| 2,522,082 | Arnold | Sept. 12, 1950 |
| 2,640,171 | Lewin et al. | May 26, 1953 |